United States Patent
Shimizu

(10) Patent No.: US 9,491,016 B2
(45) Date of Patent: Nov. 8, 2016

(54) EQUALIZATION PROCESSING APPARATUS, WIRELESS COMMUNICATION TERMINAL, AND EQUALIZATION PROCESSING METHOD

(71) Applicant: FUJITSU LIMITED, Kawasaki-shi, Kanagawa (JP)

(72) Inventor: Masatsugu Shimizu, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 58 days.

(21) Appl. No.: 14/247,203

(22) Filed: Apr. 7, 2014

(65) Prior Publication Data

US 2014/0219328 A1    Aug. 7, 2014

Related U.S. Application Data

(63) Continuation of application No. PCT/JP2011/075515, filed on Nov. 4, 2011.

(51) Int. Cl.
*H04L 25/03* (2006.01)
*H04L 27/01* (2006.01)
*H04L 25/02* (2006.01)
*H04L 1/00* (2006.01)

(52) U.S. Cl.
CPC ............ *H04L 27/01* (2013.01); *H04L 25/0228* (2013.01); *H04L 25/03012* (2013.01); *H04L 1/004* (2013.01)

(58) Field of Classification Search
CPC ................ H04L 25/03057; H04L 25/0307
USPC .......................................... 375/229, 230, 232
See application file for complete search history.

(56) References Cited

U.S. PATENT DOCUMENTS

| 5,414,699 | A |  | 5/1995 | Lee |  |
|---|---|---|---|---|---|
| 2008/0219325 | A1 |  | 9/2008 | Sambhwani |  |
| 2009/0213969 | A1 |  | 8/2009 | Hasegawa et al. |  |
| 2010/0020855 | A1 |  | 1/2010 | Ito et al. |  |
| 2010/0226423 | A1 | * | 9/2010 | Chen et al. | .......... 375/232 |

FOREIGN PATENT DOCUMENTS

| JP | 04-129479 |  | 4/1992 |
|---|---|---|---|
| JP | 09-503362 |  | 3/1997 |
| JP | 2978513 |  | 11/1999 |
| JP | 2000-091951 |  | 3/2000 |
| JP | 2002-344352 |  | 11/2002 |
| JP | 2002344352 | A * | 11/2002 |
| JP | 2007-060313 |  | 3/2007 |
| JP | 2009-206809 |  | 9/2009 |
| JP | 2010-521121 |  | 6/2010 |
| WO | 2008136079 |  | 11/2008 |

OTHER PUBLICATIONS

International Search Report, mailed in connection with PCT/JP2011/075515, and mailed Nov. 29, 2011.

* cited by examiner

*Primary Examiner* — Kevin M Burd
(74) *Attorney, Agent, or Firm* — Fujitsu Patent Center

(57) ABSTRACT

An equalization processing apparatus includes a correlation matrix generating unit. The correlation matrix generating unit calculates a correlation value between a plurality of paths of a received signal coming from the paths based on a correlation pattern selected from a plurality of correlation patterns indicating combinations of the numbers of correlation chips as arbitrary chips to be used for calculation of the correlation value among all the chips of the received signal and identification numbers of the correlation chips so as to generate a correlation matrix that is applied to equalization processing on the received signal.

5 Claims, 10 Drawing Sheets

EQUALIZATION DATA

| Index | CHANNEL TYPE | SPREADING FACTOR | SPREADING CODE NUMBER | TRANSMISSION POWER |
|---|---|---|---|---|
| 1 | CPICH | 256 | 0 | -10.0 dB |
| 2 | PCCPCH | 256 | 1 | -12.0 dB |
| 3 | PICH | 256 | 2 | -15.0 dB |
| 4 | DPCH | 128 | 3 | -20.0 dB |
| 5 | HS-SCCH | 128 | 2 | -12.0 dB |
| 6 | HS-DPDCH | 16 | 2 TO 15 | -1.5 dB (15 CODES IN TOTAL) |
| ... | ... | ... | ... | ... |

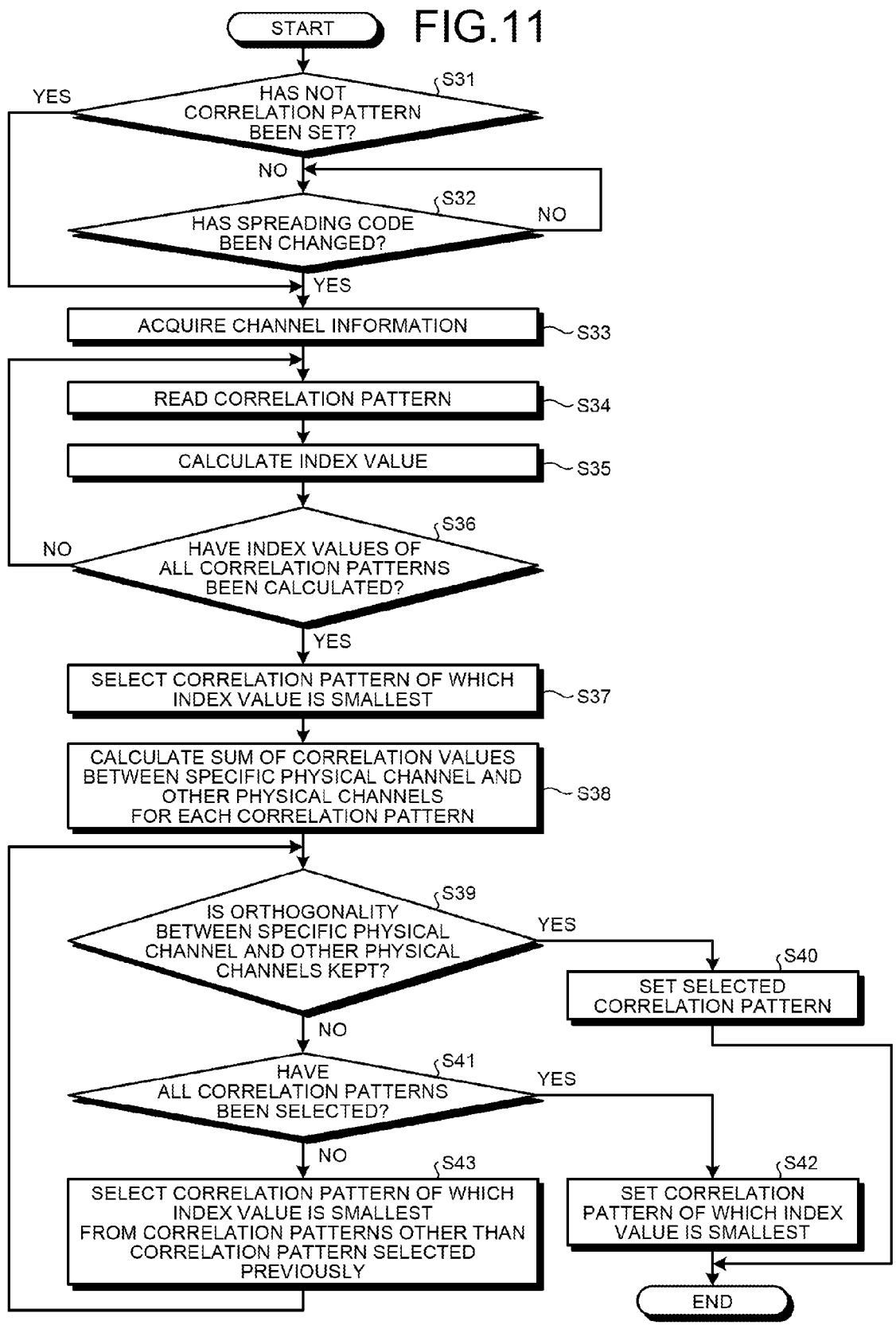

EQUALIZATION PROCESSING APPARATUS, WIRELESS COMMUNICATION TERMINAL, AND EQUALIZATION PROCESSING METHOD

CROSS-REFERENCE TO RELATED APPLICATION

This application is a continuation of International Application No. PCT/JP2011/075515, filed on Nov. 4, 2011, the entire contents of which are incorporated herein by reference.

FIELD

The embodiments discussed herein are directed to an equalization processing apparatus, a wireless communication terminal, and an equalization processing method.

BACKGROUND

Conventionally, wireless communication systems employing code division multiple access (CDMA) perform signal processing called equalization processing. The equalization processing is processing of reducing strain generated on a transmission path. In general, an equalization processing apparatus provided on a wireless communication terminal at the receiving side executes the equalization processing.

To be specific, the equalization processing apparatus calculates correlation values between a plurality of paths of a received signal coming from the paths so as to generate a correlation matrix that is applied to the equalization processing. The respective correlation values included in the correlation matrix are obtained by complex-multiplying chips of the received signal and integrating the multiplied results. Conventional technologies are described in International Publication Pamphlet No. WO 2008/136079 and Japanese Laid-open Patent Publication No. 2009-206809, for example.

In the above-mentioned conventional equalization processing apparatus, there is a problem in that an amount of operation is huge when the correlation values are calculated. For example, it is supposed that a maximum spreading factor of channels that are included in the received signal is 256. In this case, 256 chips in total of the received signal are complex-multiplied and the multiplied results are integrated. Due to this, the amount of operation with the calculation of the correlation values is huge.

Considered is a method of reducing the number of chips to be used for calculation of the correlation values in order to reduce the amount of operation with the calculation of the correlation values. For example, when the respective correlation values are calculated, the equalization processing apparatus complex-multiplies 64 chips from the head among the 256 chips in total of the received signal and integrates the multiplied results. This can reduce the amount of operation to ¼ of the conventional amount of operation. However, with the method of reducing the number of chips to be used for the calculation of the correlation values simply, orthogonality between spreading codes assigned to respective channels included in the received signal collapses in some cases. In this case, the correlation values are different from right values, resulting in deterioration in the equalization characteristics.

SUMMARY

According to an aspect of an embodiment, an equalization processing apparatus includes a calculating unit that calculates a correlation value between a plurality of paths of a received signal coming from the paths based on a correlation pattern selected from a plurality of correlation patterns indicating combinations of numbers of correlation chips as arbitrary chips to be used for calculation of the correlation value among all the chips of the received signal and identification numbers of the correlation chips; and a correlation matrix generating unit that generates, using the correlation value, a correlation matrix that is applied to equalization processing on the received signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 is a flowchart illustrating processing procedures of correlation pattern selecting processing that is performed by the equalization processing apparatus in the third embodiment.

DESCRIPTION OF EMBODIMENTS

Figure 1:
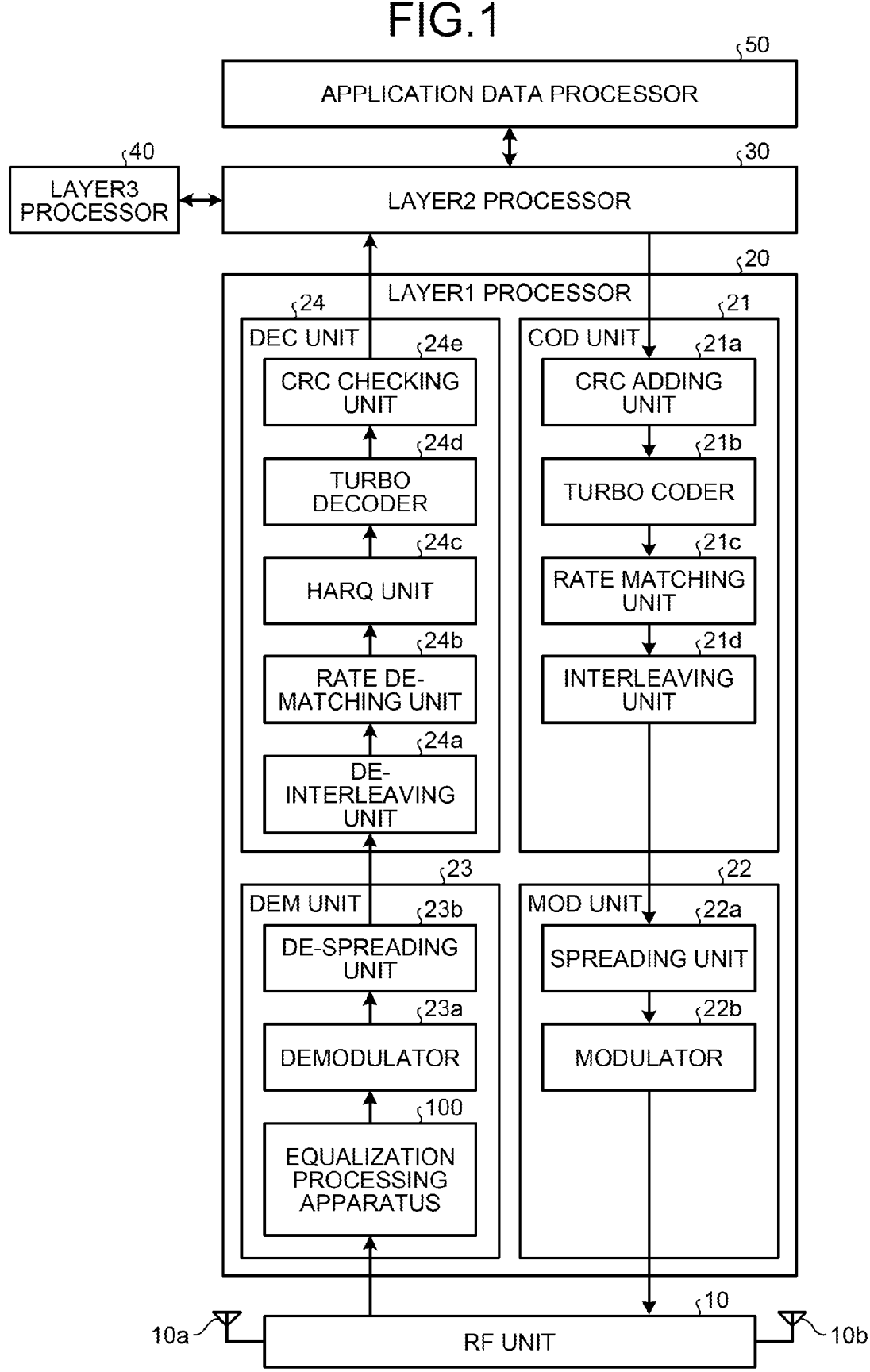
FIG. 1 is a diagram illustrating the configuration of a wireless communication terminal including an equalization processing apparatus according to a first embodiment.

Preferred embodiments of the present invention will be explained with reference to accompanying drawings. It should be noted that the embodiments do not limit the invention.

Described is a technique as the premise of the wireless communication terminal that is disclosed by the present application. A wireless communication system employing CDMA performs signal processing called equalization processing of reducing strain generated on a transmission path. An equalization processing apparatus provided on a wireless communication terminal at the receiving side executes the equalization processing.

To be specific, the equalization processing apparatus calculates correlation values between a plurality of paths of a received signal coming from the paths so as to generate a correlation matrix that is applied to the equalization processing. A correlation value $R_{ij}$ as an element of $i^{th}$ row×$j^{th}$ column that is included in the correlation matrix is obtained by the following equation (1).

$$R_{ij} = \sum_{k=0}^{255} d_i(k) \times d_j(k)^* \qquad (1)$$

NOTE THAT k: CHIP IDENTIFICATION NUMBER $d_i(k)$: RECEIVED SIGNAL OF WHICH PASS TIMING PROCEEDS BY i SAMPLES $d_j(k)$: RECEIVED SIGNAL OF WHICH PASS TIMING PROCEEDS BY j SAMPLES $d_j(k)^*$: COMPLEX CONJUGATE NUMBER OF $d_j(k)$

Next, a problem relating to the calculation of the correlation values is described. As indicated in equation (1), the respective correlation values included in the correlation matrix are obtained by complex-multiplying 256 chips in total of the received signal and integrating the multiplied results. Due to this, the amount of operation with the calculation of the correlation values is huge.

As a method of reducing the amount of operation with the calculation of the correlation values, considered is a method of reducing the number of chips (hereinafter, referred to as "correlation chips") to be used for the calculation of the correlation values. For example, when the respective correlation values are calculated, the equalization processing apparatus complex-multiplies 64 chips from the head among the 256 chips in total of the received signal. This can reduce the amount of operation to ¼ of the conventional amount of operation.

It should be noted that with the method of reducing the number of chips to be used for the calculation of the correlation values simply, orthogonality between spreading codes assigned to respective channels included in the received signal collapses in some cases. In this case, there is a problem in that the correlation values are different from right values, resulting in deterioration in the equalization characteristics. A specific example of this problem is described below.

The following describes an example in which orthogonality between the spreading codes assigned to a common pilot channel (CPICH) and a primary common control physical channel (PCCPCH) that are control channels included in the received signal collapses, as an example. As the spreading codes employed in W-CDMA, an orthogonal variable spreading factor (OVSF) code is used. The spreading codes having the spreading factor of 256 are assigned to the CPICH and the PCCPCH. A spreading code $CC_{CPICH}(k)$ (note that k=0 to 255) assigned to the CPICH is "1" for all the 256 chips in total. A spreading code $CC_{PCCPCH}(k)$ assigned to the PCCPCH is "1" for the 128 chips of the first half and "−1" for the 128 chips of the second half. When pieces of spreading data of the CPICH and the PCCPCH are assumed to $\alpha$ and $\beta$ ($\alpha$, $\beta$=1 or −1), respectively, the correlation value between the CPICH and the PCCPCH is obtained by the following equations (2) and (3). The equation (2) derives the correlation value when all the 256 chips in total of the received signal are used, and equation (3) derives the correlation value when 64 chips from the head of the 256 chips in total of the received signal are used.

$$\sum_{k=0}^{255} (\alpha \times CC_{CPICH}(k)) \times (\beta \times CC_{PCCPCH}(k)) = 0 \qquad (2)$$

$$\sum_{k=0}^{63} (\alpha \times CC_{CPICH}(k)) \times (\beta \times CC_{PCCPCH}(k)) = 64 \times \alpha \times \beta = \pm 64 \qquad (3)$$

As indicated in equation (2), when all the 256 chips of the received signal are used, the orthogonality between the spreading codes is kept, so that the correlation value is "0".

On the other hand, as indicated in equation (3), when 64 chips from the head of the 256 chips in total of the received signal are used, only the 64 chips of the first half of the spreading codes are used. Due to this, the orthogonality between the spreading codes collapses. The correlation value is "±64" that is different from "0" as the right value, and inter-code interference is generated. This results in deterioration of the equalization characteristics.

Thus, with the method of reducing the number of correlation chips simply, the orthogonality between the spreading codes assigned to the respective channels included in the received signal collapses. This results in deterioration of the equalization characteristics.

In order to solve this problem, the wireless communication terminal in the embodiment selects an appropriate correlation pattern indicating a combination of the number of correlation chips and identification numbers of the correlation chips, and calculates the correlation values based on the selected correlation pattern such that the orthogonality between the spreading codes can be kept even when the number of correlation chips is reduced. This can reduce deterioration of the equalization characteristics with a reduced amount of operation.

First Embodiment

First, described is the configuration of a wireless communication terminal including an equalization processing apparatus in a first embodiment. FIG. 1 is a diagram illustrating the configuration of the wireless communication terminal including the equalization processing apparatus in the first embodiment. The wireless communication terminal as illustrated in FIG. 1 includes a radio frequency (RF) unit 10, a Layer1 processor 20, a Layer2 processor 30, a Layer3 processor 40, and an application data processor 50.

The RF unit 10 includes an antenna 10a, and receives a downlink signal that is transmitted from a base station through the antenna 10a. The RF unit 10 performs conversion from a wireless frequency to a baseband on the received downlink signal. The RF unit 10 is an example of a receiver.

The RF unit 10 includes an antenna 10b, and transmits an uplink signal to the base station through the antenna 10b. The RF unit 10 performs conversion from the baseband to the wireless frequency on the transmission uplink signal.

The Layer1 processor 20 performs pieces of Layer1 processing such as demodulation processing, decoding processing, coding processing, and modulation processing. To be specific, the Layer1 processor 20 includes a coder (COD) unit 21, a modulator (MOD) unit 22, a demodulator (DEM) unit 23, and a decoder (DEC) unit 24.

The COD unit 21 performs the coding processing on the transmission signal. To be specific, the COD unit 21 includes a cyclic redundancy check (CRC) adding unit 21a, a turbo coder 21b, a rate matching unit 21c, and an interleaving unit 21d. The CRC adding unit 21a adds a CRC code as an error correction code to the transmission signal. The turbo coder 21b performs coding of data of the transmission signal. The rate matching unit 21c performs extension and contraction of the data in accordance with resources assigned to respective physical channels. The interleaving unit 21d performs interleaving on the data.

The MOD unit 22 performs modulation processing on the transmission signal. To be specific, the MOD unit 22 includes a spreading unit 22a and a modulator 22b. The spreading unit 22a spreads the data of the transmission signal. The modulator 22b performs multilevel modulation such as quadrature phase shift keying (QPSK), 16 quadrature amplitude modulation (16 QAM), and 64 QAM.

The DEM unit 23 performs demodulation processing by the CDMA system. The DEM unit 23 includes an equalization processing apparatus 100, a demodulator 23a, and a de-spreading unit 23b. The equalization processing apparatus 100 performs equalization processing on the received signal. The configuration of the equalization processing apparatus 100 will be described later. The demodulator 23a demodulates the data on which the multilevel modulation has been performed. The de-spreading unit 23b performs de-spreading processing so as to restore the spread data to original data.

The DEC unit 24 performs decoding processing on the received signal. To be specific, the DEC unit 24 includes a de-interleaving unit 24a, a rate de-matching unit 24b, a hybrid automatic repeat request (HARQ) unit 24c, a turbo decoder 24d, and a CRC checking unit 24e. The de-interleaving unit 24a returns the interleaved data to the original data. The rate de-matching unit 24b returns the extended and contracted data to the original data. The HARQ unit 24c synthesizes retransmitted data. The turbo decoder 24d decodes the turbo-coded data. The CRC checking unit 24e checks success and failure of the decoded data.

The Layer2 processor 30 includes sub-layers such as medium access control (MAC), radio link control (RLC), and packet data convergence protocol (PDCP). The Layer2 processor 30 performs separation and binding of the data in accordance with a format of each sub layer. The Layer3 processor 40 controls operations of the terminal, such as call connection and handover processing. The application data processor 50 is an upper layer for processing user data.

Figure 2:
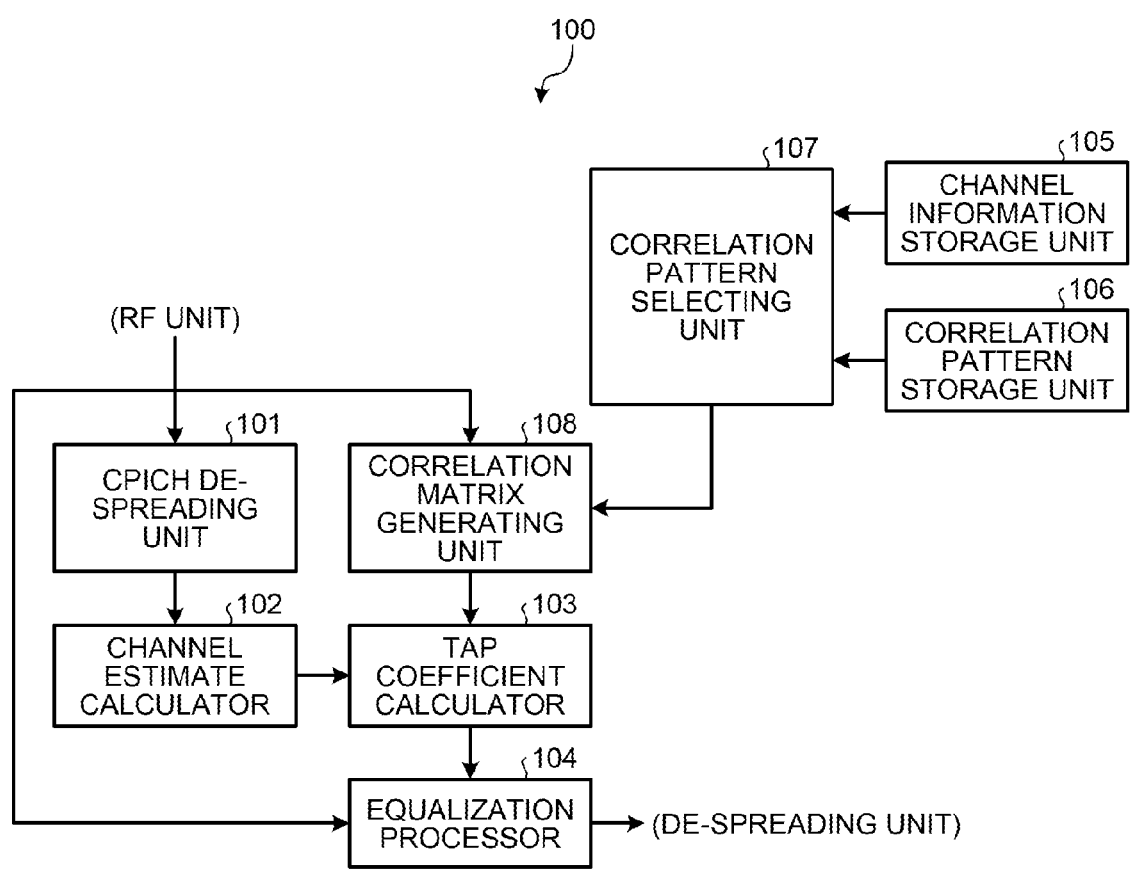
FIG. 2 is a diagram illustrating the configuration of the equalization processing apparatus in the first embodiment.

Next, details of the configuration of the equalization processing apparatus 100 as illustrated in FIG. 1 are described. FIG. 2 is a diagram illustrating the configuration of the equalization processing apparatus 100 in the first embodiment. As illustrated in FIG. 2, the equalization processing apparatus 100 includes a common pilot channel (CPICH) de-spreading unit 101, a channel estimate calculator 102, a tap coefficient calculator 103, and an equalization processor 104. The equalization processing apparatus 100 further includes a channel information storage unit 105, a correlation pattern storage unit 106, a correlation pattern selecting unit 107, and a correlation matrix generating unit 108.

The CPICH de-spreading unit 101 de-spreads a common pilot channel (CPICH) included in the received signal, and outputs the de-spread data to the channel estimate calculator 102. The channel estimate calculator 102 establishes correlation between the de-spread data and data of an existing signal so as to calculate a channel estimate h, and outputs the channel estimate h to the tap coefficient calculator 103.

The tap coefficient calculator 103 receives the channel estimate h from the channel estimate calculator 102. The tap coefficient calculator 103 receives a correlation matrix R from the correlation matrix generating unit 108, which will be described later. The tap coefficient calculator 103 solves a system of equations as indicated by the following equation (4) by using the channel estimate h and the correlation matrix R so as to calculate a tap coefficient w.

$$\sum_j R_{ij} W_j = h_i \tag{4}$$

The tap coefficient calculator 103 sets the calculated tap coefficient w as a weighting coefficient to the equalization processor 104.

Figures 3, 4:
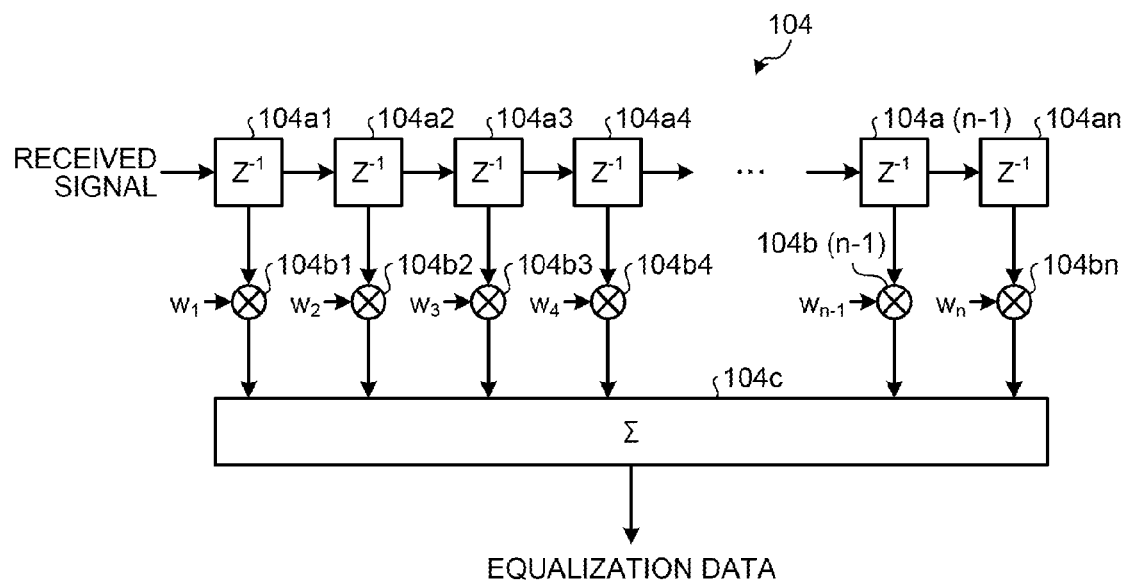
FIG. 3 is a diagram illustrating the configuration example of an equalization processor.
FIG. 4 is a table illustrating an example of a channel information storage unit.

The equalization processor 104 configures a finite impulse response (FIR) filter, and performs the equalization processing on the received signal. The configuration example of the equalization processor 104 is described with reference to FIG. 3. FIG. 3 is a view illustrating the configuration example of the equalization processor 104.

The equalization processor 104 as illustrated in FIG. 3 includes delay circuits 104a1 to 104an, multipliers 104b1 to 104bn, and an adder 104c. The delay circuits 104a1 to 104an delay the received signal by unit time. The multipliers 104b1 to 104bn multiply outputs of the delay circuits 104a1 to 104an by the tap coefficient w that has been set as the weighting coefficient by the tap coefficient calculator 103, respectively. The adder 104c adds the outputs of the multipliers 104b1 to 104bn, and outputs the added result as data after the equalization to the de-spreading unit 23b.

Returning back to FIG. 2, the channel information storage unit 105 stores therein pieces of information assigned to the respective physical channels included in the received signal as pieces of channel information. The pieces of channel information stored in the channel information storage unit 105 are pieces of information that are provided to the wireless communication terminal from a network or a base station when the wireless communication terminal is connected to an external network or starts communication with the base station. An example of the channel information storage unit 105 is illustrated in FIG. 4. FIG. 4 is a table illustrating the example of the channel information storage unit 105.

As illustrated in FIG. 4, the channel information storage unit 105 stores therein, as the pieces of channel information, items of a channel type, a spreading factor, a spreading code number, and a transmission power in a correspondence manner. Among these items, the channel type indicates a type of the physical channel included in the received signal. The spreading factor corresponds to a code length of the spreading code assigned to each physical channel, and is a ratio of a spreading code rate (chip rate) relative to a transmission data rate (bit rate). The spreading code number indicates an identification number of the spreading code assigned to each physical channel. The transmission power is transmission power assigned to each physical channel. The transmission power in the embodiment is expressed by a ratio of the transmission power assigned to each physical channel relative to the entire transmission power of the base station. It should be noted that the transmission power may be a relative value with respect to one physical channel as a reference such as the CPICH.

Figure 5:
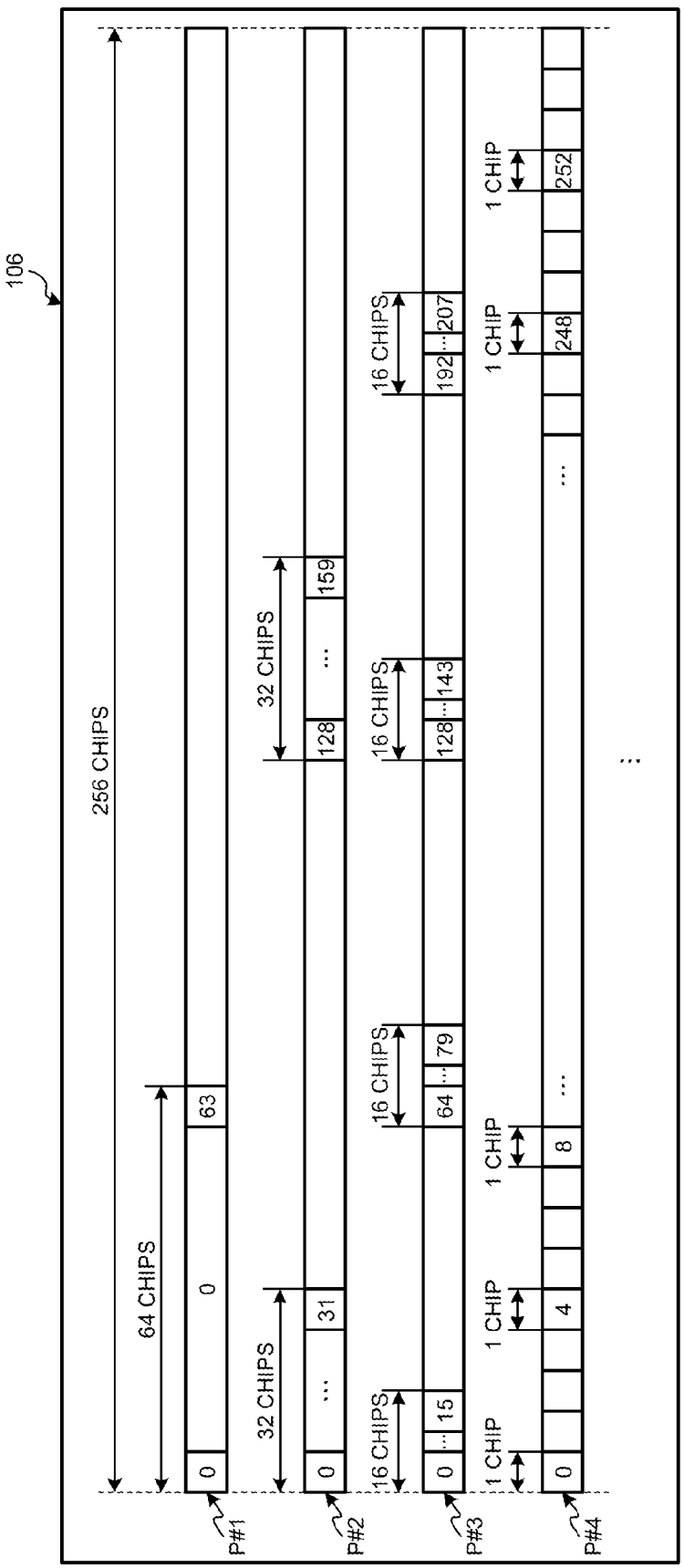
FIG. 5 is a diagram illustrating an example of a correlation pattern storage unit.

The correlation pattern storage unit 106 stores therein correlation patterns of the arbitrary number. The correlation patterns indicate combinations of the numbers of correlation chips as arbitrary chips to be used for calculation of the correlation values between the physical channels among all the chips of the received signal and the identification numbers of the correlation chips. An example of the correlation pattern storage unit 106 is illustrated in FIG. 5. FIG. 5 is a diagram illustrating an example of the correlation pattern storage unit 106.

As illustrated in FIG. 5, the correlation pattern storage unit 106 stores therein correlation patterns P#1, P#2, P#3, P#4, . . . . In the correlation patterns P#1, P#2, P#3, P#4, . . . , arbitrary chips among the 256 chips in total of the received signal are set as the correlation chips and the combinations of the numbers of correlation chips and the identification numbers of the correlation chips are indicated. For example, in the correlation pattern P#1, 64 chips at the head of the 256 chips in total are set as the correlation chips and a combination of the number of the correlation chips (64 chips) and the identification numbers k=0 to 63 of the correlation chips is indicated. In the correlation pattern P#2, 32 chips at the heads of respective two blocks obtained by dividing the 256 chips in total into two equal parts are set as the correlation chips and a combination of the number of the correlation chips (64 chips) and the identification numbers k=0 to 31, 128 to 159 of the correlation chips is indicated. In the correlation pattern P#3, 16 chips at the heads of respective four blocks obtained by dividing the 256 chips in total into four equal parts are set as the correlation chips and a combination of the number of the correlation chips (64 chips) and the identification numbers k=0 to 15, 64 to 79, . . . , 192 to 207 of the correlation chips is indicated. In the correlation pattern P#4, 1 chip at the heads of respective 64 blocks obtained by dividing the 256 chips in total into 64 equal parts are set as the correlation chip and a combination of the number of the correlation chips (64 chips) and the identification numbers k=0, 4, . . . , 252 is indicated.

In the above-mentioned correlation patterns P#2, P#3, P#4, . . . , the chips included in the plurality of blocks obtained by dividing the 256 chips in total of the received signal into equal parts are set as the correlation chips. Alternatively, in the correlation patterns, the chips of arbitrary identification numbers among the 256 chips in total of the received signal may be set as the correlation chips.

Returning back to FIG. 2, the correlation pattern selecting unit 107 calculates an index value C indicating the degree of the orthogonality between the spreading codes assigned to the respective physical channels for each correlation pattern. The correlation pattern selecting unit 107 selects the correlation pattern of which the index value C is the smallest among the correlation patterns of the arbitrary number that are stored in the correlation pattern storage unit 106 so as to set it to the correlation matrix generating unit 108.

Details of the processing of calculating the index value C that is performed by the correlation pattern selecting unit 107 are described. The correlation pattern selecting unit 107 acquires the spreading factors and the spreading code numbers with reference to the channel information storage unit 105, and specifies the spreading codes assigned to the respective physical channels based on the acquired spreading factors and spreading code numbers. The correlation pattern selecting unit 107 acquires the transmission powers of the respective physical channels with reference to the channel information storage unit 105.

Then, the correlation pattern selecting unit 107 calculates, as the index value C, a sum of the multiplied results obtained by multiplying the correlation values between the spreading codes assigned to the respective physical channels by the transmission powers of the respective physical channels for each correlation pattern. That is to say, the correlation pattern selecting unit 107 calculates the index value C for each correlation pattern by using the following equation (5).

Equation 5

$$C = \sum_{i \neq j} P_i \times P_j \times \sum_{k=0}^{255} CC_i(k) \times CC_j(k) \quad (5)$$

NOTE THAT
i, j: INDEX OF PHYSICAL CHANNEL
$P_i$, Pj: TRANSMISSION POWER OF EACH PHYSICAL CANNEL
k: IDENTIFICATION NUMBER OF CORRELATION CHIP INDICATED BY CORRELATION PATTERN

It is found that the degree of collapse of the orthogonality between the spreading codes is lower in the correlation pattern of which the index value C is smaller by referring to equation (5).

When there is a physical channel having the spreading factor (spreading code length) of lower than 256, the correlation pattern selecting unit 107 copies the spreading code such that the spreading code length is 256. Then, the correlation pattern selecting unit 107 calculates the index value C base on equation (5) by using the copied spreading code.

The correlation pattern selecting unit 107 monitors the channel information storage unit 105 so as to detect a change in the spreading codes assigned to the physical channels. The spreading codes assigned to the physical channels change when the physical channels are increased or decreased at the time of the handover or by addition or deletion of call. Then, when the correlation pattern selecting unit 107 detects a change in the spreading codes, it calculates the index values C for each of the correlation patterns and selects the correlation pattern of which the index value C is the smallest.

The correlation matrix generating unit 108 receives the correlation pattern of which the index value C is the smallest from the correlation pattern selecting unit 107. The correlation matrix generating unit 108 calculates the correlation value $R_{ij}$ based on the correlation pattern of which the index value C is the smallest so as to generate the correlation matrix R that is applied to the equalization processing on the received signal. To be specific, the correlation matrix generating unit 108 calculates the correlation value $R_{ij}$ by applying the combination of the number of correlation chips and the identification numbers of the correlation chips that is indicated by the correlation pattern of which the index value C is the smallest to the above-mentioned equation (1) so as to generate the correlation matrix R.

For example, it is supposed that the index value C corresponding to the correlation pattern P#4 is the smallest among the correlation patterns P#1 to P#4 in the correlation pattern storage unit 106 as illustrated in FIG. 5. In this case, the correlation matrix generating unit 108 calculates the correlation value $R_{ij}$ by applying the combination of the number of correlation chips (64 correlation chips) and the identification numbers k=0, 4, . . . , 252 that is indicated by the correlation pattern P#4 to the above-mentioned equation (1) so as to generate the correlation matrix R.

Figure 6:
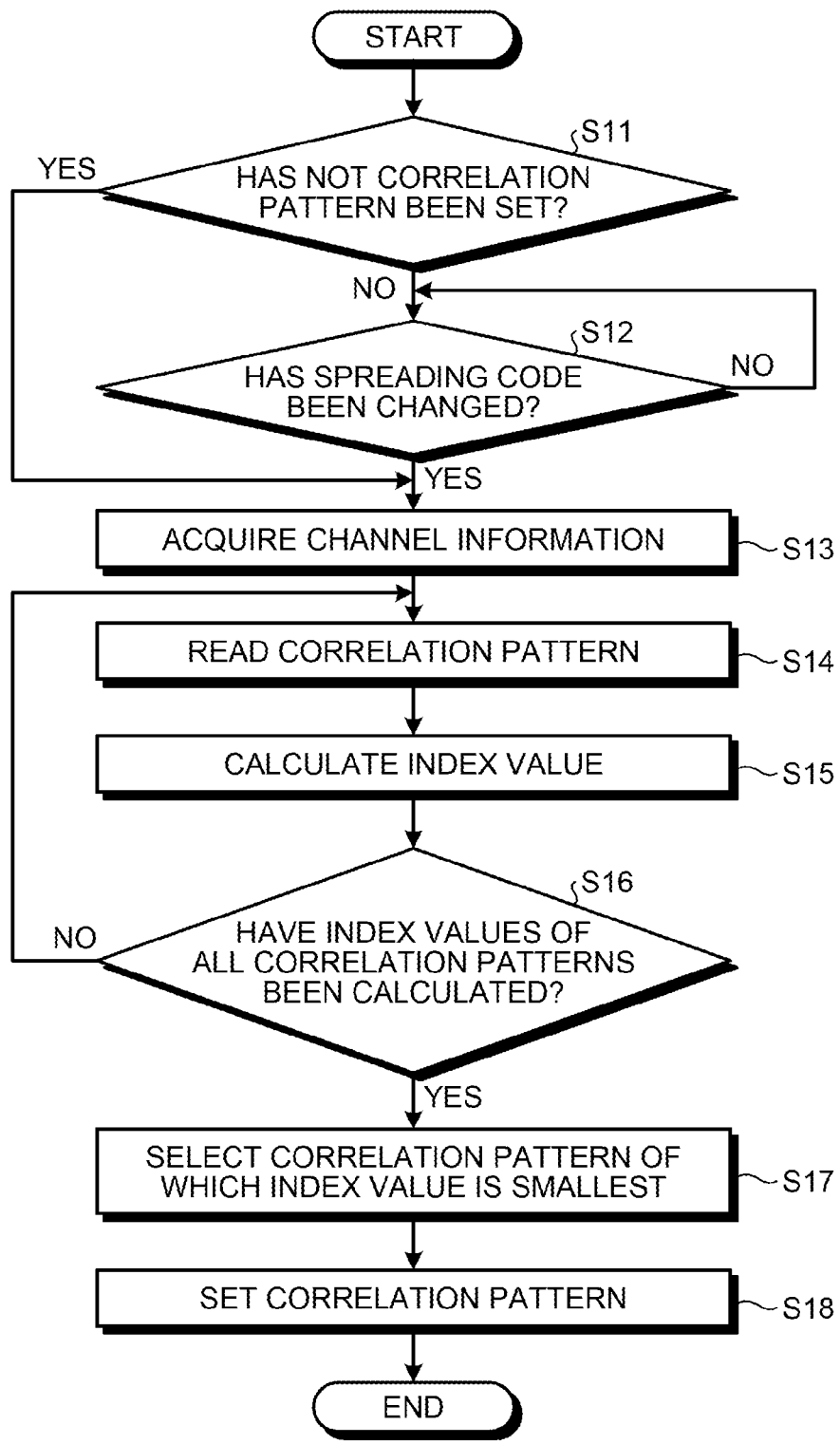
FIG. 6 is a flowchart illustrating processing procedures of correlation pattern selecting processing that is performed by the equalization processing apparatus in the first embodiment.

Next, the processing procedures of the correlation pattern selecting processing that is performed by the equalization processing apparatus 100 in the first embodiment are described. FIG. 6 is a flowchart illustrating the processing procedures of the correlation pattern selecting processing that is performed by the equalization processing apparatus 100 in the first embodiment.

As illustrated in FIG. 6, the correlation pattern selecting unit 107 of the equalization processing apparatus 100 determines whether the correlation pattern has not been already set to the correlation matrix generating unit 108 (Step S11). If the correlation pattern has been already set to the correlation matrix generating unit 108 (No at Step S11), the correlation pattern selecting unit 107 monitors the channel information storage unit 105 so as to detect whether the spreading codes assigned to the physical channels have been changed (Step S12). If the correlation pattern selecting unit 107 detects that the spreading codes assigned to the physical channels have not been changed (No at Step S12), it continues to monitor the channel information storage unit 105 and waits until a change in the spreading codes is detected.

On the other hand, if the correlation pattern has not been set to the correlation matrix generating unit 108 (Yes at Step S11), or if a change in the spreading codes is detected (Yes at Step S12), the correlation pattern selecting unit 107 acquires the channel information from the channel information storage unit 105 (Step S13). That is to say, the correlation pattern selecting unit 107 acquires the spreading factors and the spreading codes, and specifies the spreading codes assigned to the physical channels based on the acquired spreading factors and spreading code numbers with reference to the channel information storage unit 105. The correlation pattern selecting unit 107 acquires the transmission powers of the respective physical channels with reference to the channel information storage unit 105.

Then, the correlation pattern selecting unit 107 reads any one correlation pattern of the correlation patterns stored in the correlation pattern storage unit 106 (Step S14), and calculates the index value C corresponding to the read correlation pattern (Step S15). That is to say, the correlation pattern selecting unit 107 calculates, as the index value C, the sum of the multiplied results obtained by multiplying the correlation values between the spreading codes assigned to the physical channels by the transmission powers of the respective physical channels.

Subsequently, if the correlation pattern selecting unit 107 have not calculated the index values C corresponding to all the correlation patterns stored in the correlation pattern storage unit 106 (No at Step S16), the process is returned to the processing at Step S14. On the other hand, if the correlation pattern selecting unit 107 has calculated the index values C corresponding to all the correlation patterns (Yes at Step S16), it selects the correlation pattern of which the index value C is the smallest among the correlation patterns stored in the correlation pattern storage unit 106 (Step S17). Then, the correlation pattern selecting unit 107 sets the correlation pattern of which the index value C is the smallest to the correlation matrix generating unit 108 (Step S18). Thereafter, the correlation matrix generating unit 108 calculates the correlation value $R_{ij}$ based on the combination of the number of correlation chips and the identification numbers of the correlation chips that is indicated by the correlation pattern of which the index value C is the smallest so as to generate the correlation matrix R. This can keep the orthogonality between the spreading codes even when the number of correlation chips is decreased.

As described above, the equalization processing apparatus 100 in the first embodiment selects the correlation pattern of which the index value C indicating the degree of the orthogonality between the spreading codes is the smallest among the correlation patterns indicating the combinations of the numbers of correlation chips and the identification numbers of the correlation chips. Then, the equalization processing apparatus 100 calculates the correlation value $R_{ij}$ based on the selected correlation pattern so as to generate the correlation matrix R. With this, the equalization processing apparatus 100 can keep the orthogonality between the spreading codes even when the number of correlation chips is decreased. As a result, deterioration of the equalization characteristics can be reduced with a reduced amount of operation.

Furthermore, the equalization processing apparatus 100 in the embodiment calculates, as the index values C, the sums of the multiplied results obtained by multiplying the correlation values between the spreading codes assigned to the respective physical channels by the transmission powers of the respective physical channels. With this, the equalization processing apparatus 100 can calculate the index value C having high reliability so as to select the correlation pattern capable of keeping the orthogonality between the spreading codes appropriately. This can reduce deterioration of the equalization characteristics effectively.

In addition, when the equalization processing apparatus 100 in the embodiment detects a change in the spreading codes assigned to the respective physical channels, it calculates the index values C for each of the correlation patterns, and selects the correlation pattern of which the index value C is the smallest. In other words, when the spreading codes are not changed, the equalization processing apparatus 100 does not execute the calculation of the index values C and the selection of the correlation pattern, thereby further reducing the amount of operation.

Second Embodiment

In the above-mentioned first embodiment, the correlation pattern selecting unit 107 calculates, as the index value C, the sum of the multiplied results obtained by multiplying the correlation values between the spreading codes assigned to the respective physical channels by the transmission powers of the respective physical channels for each correlation pattern. It should be noted that a user data channel among the physical channels is configured by random data basically. With this, even when as the spreading factor thereof is lower, data thereof contained in the correlation operation is larger and the orthogonality between the spreading codes collapses, an average of the correlation values between the user data channel and other physical channels can be "0". Based on this, in the embodiment, the correlation pattern selecting unit removes the user data channel from the physical channels as targets of calculation of the index value C.

Figure 7:
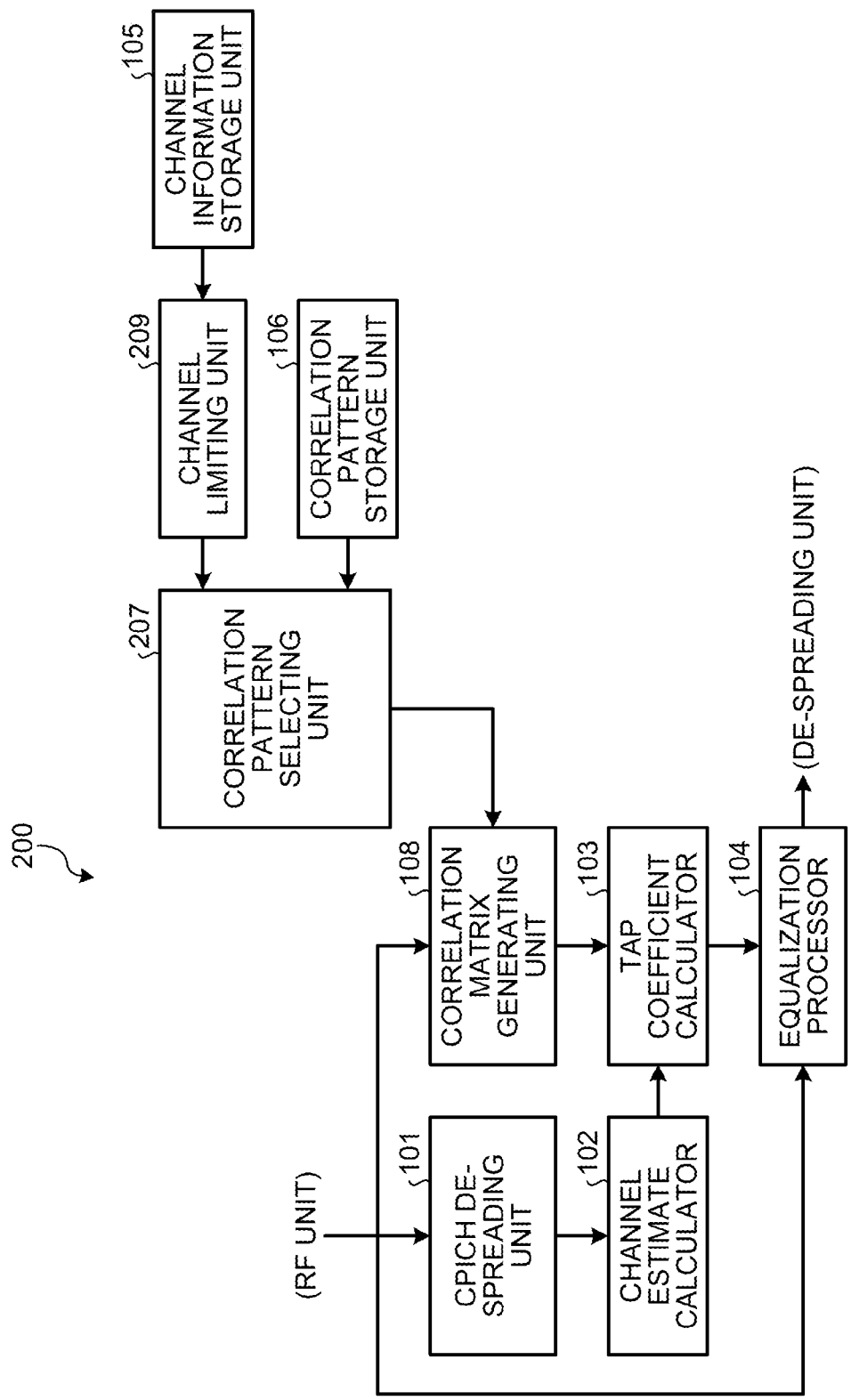
FIG. 7 is a diagram illustrating the configuration of an equalization processing apparatus according to a second embodiment.

First, the configuration of an equalization processing apparatus 200 in a second embodiment is described. FIG. 7 is a diagram illustrating the configuration of the equalization processing apparatus 200 in the second embodiment. Hereinafter, the same reference numerals denote the constituent components having the same functions as those of the constituent components as illustrated in FIG. 2, and detail description thereof is omitted. The configuration of the wireless communication terminal including the equalization processing apparatus 200 in the second embodiment is the same as that of the wireless communication terminal as illustrated in FIG. 1, and description thereof is omitted.

As illustrated in FIG. 7, the equalization processing apparatus 200 includes a correlation pattern selecting unit 207 and a channel limiting unit 209 newly instead of the correlation pattern selecting unit 107 included by the equalization processing apparatus 100 as illustrated in FIG. 2.

The channel limiting unit 209 limits the physical channels (hereinafter, referred to as "target physical channel") as targets of calculation of the index value C by the correlation pattern selecting unit 207. To be specific, when the correlation pattern selecting unit 207 acquires the channel information from the channel information storage unit 105, the channel limiting unit 209 specifies the user data channel from the channel types with reference to the channel information storage unit 105. Then, the channel limiting unit 209 removes the specified user data channel from the target physical channels so as to limit the target physical channels. Hereinafter, the target physical channels limited by the channel limiting unit 209 are referred to as limited physical channels. Then, the channel limiting unit 209 notifies the correlation pattern selecting unit 207 of the limited physical channels.

The correlation pattern selecting unit 207 in the embodiment specifies the user data channel from the channel types with reference to the channel information storage unit 105. Alternatively, the correlation pattern selecting unit 207 may specify, as the user data channel, a physical channel having the spreading factor of equal to or lower than a certain value with reference to the channel information storage unit 105. In this case, the correlation pattern selecting unit 207 specifies, as the user data channel, a physical channel high speed-dedicated physical data channel (HS-DPDCH) having the spreading factor of equal to or lower than the certain value (for example, 128) with reference to the channel information storage unit 105 as illustrated in FIG. 4. Then, the correlation pattern selecting unit 207 removes the specified user data channel from the target physical channels so as to limit the target physical channels.

The correlation pattern selecting unit 207 receives the limited physical channels from the channel limiting unit 209. The correlation pattern selecting unit 207 calculates the index value C indicating the degree of the orthogonality between the spreading codes assigned to the respective limited physical channels for each correlation pattern. To be specific, the correlation pattern selecting unit 207 calculates, as the index value C, the sum of the multiplied results obtained by multiplying the correlation values between the spreading codes assigned to the respective limited physical channels by the transmission powers of the respective physical channels for each correlation pattern. That is to say, the correlation pattern selecting unit 207 solves the above-mentioned equation (5) by using the spreading codes and the transmission powers of the limited physical channels only so as to calculate the index value C for each correlation pattern.

Figure 8:
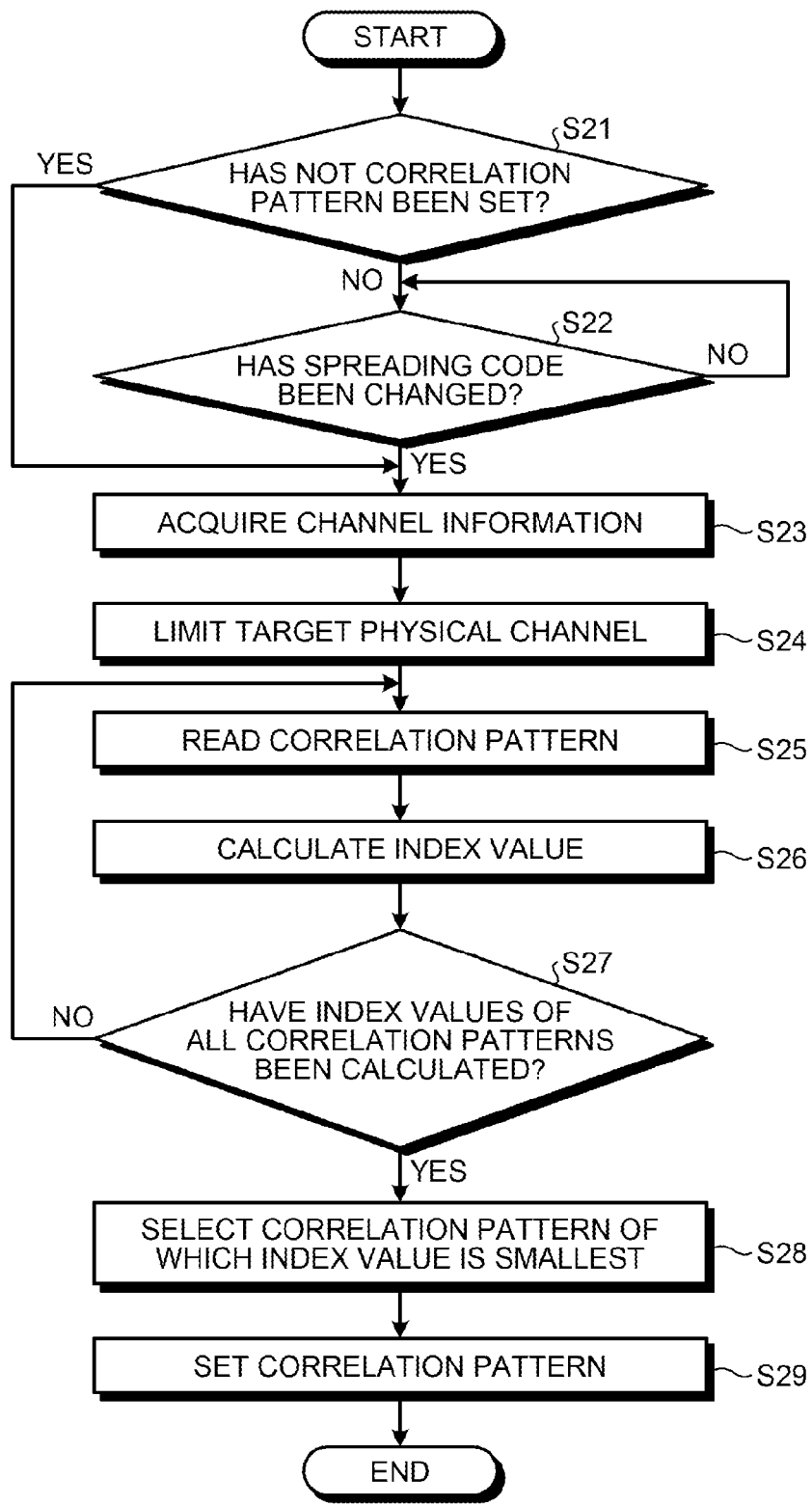
FIG. 8 is a flowchart illustrating processing procedures of correlation pattern selecting processing that is performed by the equalization processing apparatus in the second embodiment.

Next, the processing procedures of the correlation pattern selecting processing that is performed by the equalization processing apparatus 200 in the second embodiment are described. FIG. 8 is a flowchart illustrating the processing procedures of the correlation pattern selecting processing that is performed by the equalization processing apparatus 200 in the second embodiment. Detail description of the processing procedures that are the same as the processing procedures as illustrated in FIG. 6 is omitted. That is to say, the pieces of processing at Step S11 to Step S13 as illustrated in FIG. 6 correspond to pieces of processing at Step S21 to Step S23 as illustrated in FIG. 8, respectively. The pieces of processing at Step S14 to Step S18 correspond to pieces of processing at Step S25 to Step S29, respectively.

The following describes the difference in the processing procedures between the second embodiment and the first embodiment. As illustrated in FIG. 8, when the correlation pattern selecting unit 207 acquires the channel information from the channel information storage unit 105 (Step S23), the channel limiting unit 209 limits the target physical channels (Step S24). That is to say, the channel limiting unit 209 specifies the user data channel from the channel types with reference to the channel information storage unit 105. Then, the channel limiting unit 209 removes the specified user data channel from the target physical channels so as to limit the target physical channels. The channel limiting unit 209 notifies the correlation pattern selecting unit 207 of the limited physical channels.

The correlation pattern selecting unit 207 reads any one correlation pattern of the correlation patterns stored in the correlation pattern storage unit 106 (Step S25), and calculates the index value C corresponding to the read correlation pattern (Step S26). That is to say, the correlation pattern selecting unit 207 calculates, as the index value C, the sum of the multiplied results obtained by multiplying the correlation values between the spreading codes assigned to the limited physical channels by the transmission powers of the respective limited physical channels.

As described above, the equalization processing apparatus 200 in the second embodiment removes the user data channel from the physical channels as the targets of calculation of the index value C by the correlation pattern selecting unit 207 so as to limit the physical channels. With this, the equalization processing apparatus 200 can reduce the amount of operation with the calculation of the index value C.

Third Embodiment

In the first embodiment, the correlation pattern selecting unit 107 selects the correlation pattern of which the index value C indicating the degree of the orthogonality between the spreading codes assigned to the respective physical channels is the smallest. This can keep the orthogonality among all the spreading codes assigned to the respective physical channels collectively. On the other hand, the orthogonality between a desired physical channel and other physical channels that are included in the physical channels collapses and inter-code interference that is given to the other physical channels by the desired physical channel is not reduced in some cases. In order to solve this, in the embodiment, a certain value indicating the orthogonality between the desired physical channel and other physical channels is calculated for each correlation pattern, and the correlation pattern of which the certain value is 0 is selected in priority to the correlation pattern of which the index value C is the smallest.

Figure 9:
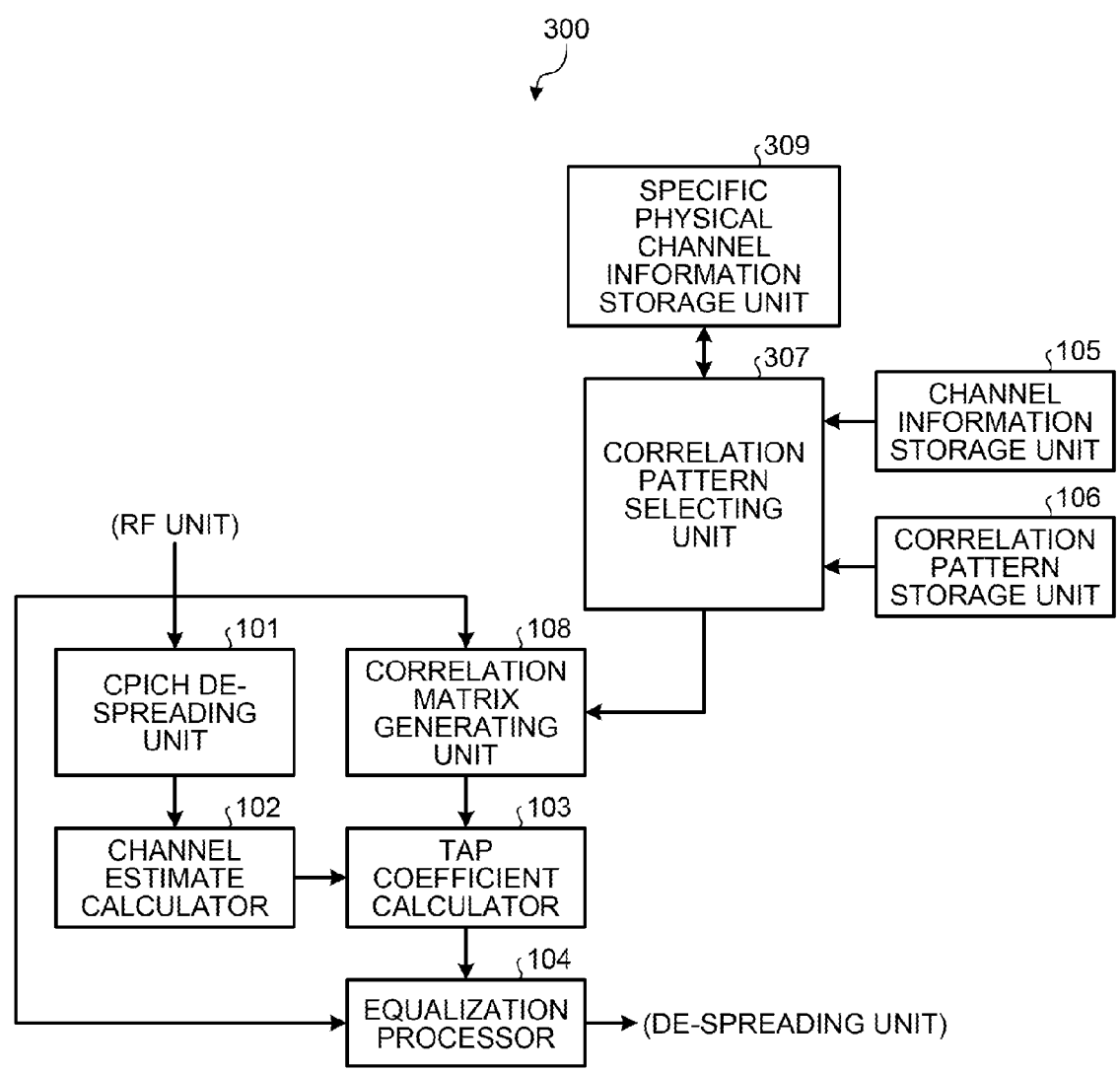
FIG. 9 is a diagram illustrating the configuration of an equalization processing apparatus according to a third embodiment.

First, the configuration of an equalization processing apparatus in a third embodiment is described. FIG. 9 is a diagram illustrating the configuration of an equalization processing apparatus 300 in the third embodiment. Hereinafter, the same reference numerals denote the constituent components having the same functions as those of the constituent components as illustrated in FIG. 2, and detail description thereof is omitted. The configuration of the wireless communication terminal including the equalization processing apparatus 300 in the third embodiment is the same as that of the wireless communication terminal as illustrated in FIG. 1, and description thereof is omitted.

As illustrated in FIG. 9, the equalization processing apparatus 300 includes a correlation pattern selecting unit 307 and a specific physical channel information storage unit 309 newly instead of the correlation pattern selecting unit 107 included by the equalization processing apparatus 100 as illustrated in FIG. 2.

The correlation pattern selecting unit 307 calculates the certain value indicating the orthogonality between the specific physical channel (hereinafter, referred to as "specific physical channel") and other physical channels other than the specific physical channel that are included in the physical channels for each correlation pattern. Then, the correlation pattern selecting unit 307 selects the correlation pattern having the certain value of "0" in priority to the correlation pattern of which the index value C is the smallest.

A specific example of processing that is performed by the correlation pattern selecting unit 307 is described. For example, it is supposed that the PICH among the physical channels stored in the channel information storage unit 105 as illustrated in FIG. 4 is set as the specific physical channel. In this case, the correlation pattern selecting unit 307 calculates the sum of the correlation values between the PICH and other physical channels as the certain value indicating the degree of the orthogonality between the PICH and other physical channels other than the PICH for each correlation pattern stored in the correlation pattern storage unit 106. Then, the correlation pattern selecting unit 307 stores the calculated sums of the correlation values in the specific physical channel information storage unit 309 for the corresponding correlation patterns. When the correlation pattern selecting unit 307 selects the correlation pattern of which the index value C is the smallest among the correlation patterns stored in the correlation pattern storage unit 106, it refers to the specific physical channel information storage unit 309. Then, the correlation pattern selecting unit 307 determines whether the sum of the correlation values corresponding to the correlation pattern of which the index value C is the smallest is "0". In other words, when the correlation pattern selecting unit 307 sets the correlation pattern of which the index value C is the smallest to the correlation matrix generating unit 108, it determines whether the orthogonality between the PICH and other physical channels other than the PICH is kept.

If the orthogonality between the PICH and other physical channels other than the PICH is kept, that is, when the sum of the correlation values corresponding to the correlation pattern of which the index value C is the smallest is "0", the correlation pattern selecting unit 307 sets the correlation pattern to the correlation matrix generating unit 108. On the other hand, if the orthogonality between the PICH and other physical channels other than the PICH is not kept, that is, when the sum of the correlation values corresponding to the correlation pattern of which the index value C is the smallest is not "0", the correlation pattern selecting unit 307 reselects a correlation pattern of which the index value C is the second-smallest. Then, the correlation pattern selecting unit 307 determines whether the sum of the correlation values corresponding to the reselected correlation pattern is "0". If the sum of the correlation values corresponding to the reselected correlation pattern is "0", the correlation pattern selecting unit 307 sets the correlation pattern to the correlation matrix generating unit 108. On the other hand, if the sum of the correlation values corresponding to the reselected correlation pattern is not "0", the correlation pattern selecting unit 307 reselects a correlation pattern of which the index value C is the third-smallest without setting the correlation pattern to the correlation matrix generating unit 108. The correlation pattern selecting unit 307 repeatedly executes a series of processing as described above until all the correlation patterns stored in the correlation pattern storage unit 106 are selected. If the correlation pattern selecting unit 307 cannot find the correlation pattern of which the sum of the correlation values is "0", it sets the correlation pattern of which the index value C is the smallest to the correlation matrix generating unit 108.

Thus, the correlation pattern selecting unit 307 selects the correlation pattern of which the certain value indicating the degree of the orthogonality between the specific physical channel and other physical channels is "0" in priority to the correlation pattern of which the index value C is the smallest. With this, the orthogonality between the specific physical channel and other physical channels is kept. This reduces inter-code interference that is given to the other physical channels by the specific physical channel.

The specific physical channel information storage unit 309 stores therein the correlation values between the specific physical channel and the other physical channels and the sum of the correlation values as the certain values indicating the degree of the orthogonality between the specific physical channel and the other physical channels other than the specific physical channel. The correlation values and the sum of the correlation values that are stored in the specific physical channel information storage unit 309 are calculated by the correlation pattern selecting unit 307 to be stored. An example of the specific physical channel information storage unit 309 is illustrated in FIG. 10.

Figure 10:
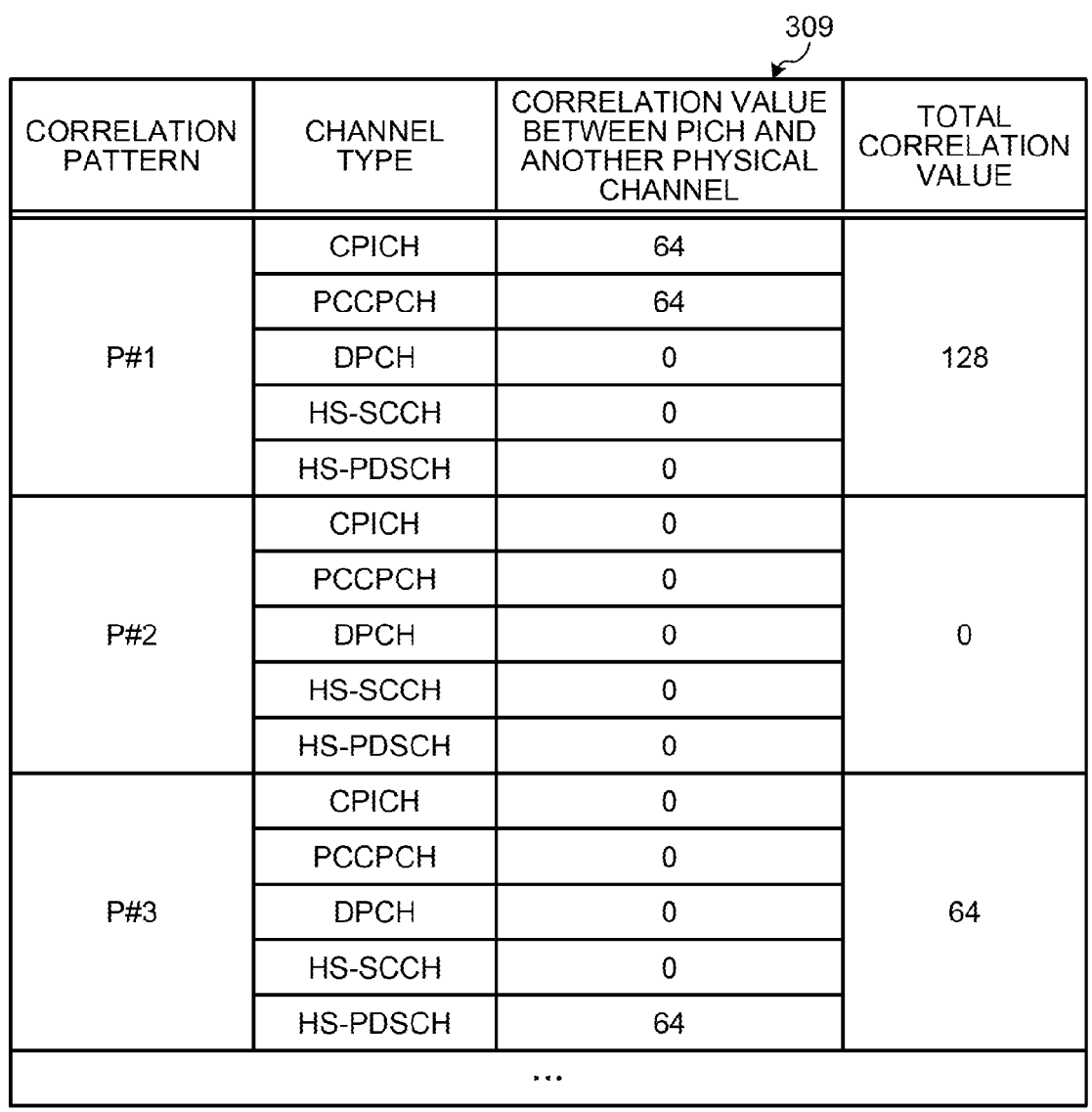
FIG. 10 is a table illustrating an example of a specific physical channel information storage unit.

FIG. 10 is a table illustrating an example of the specific physical channel information storage unit 309. FIG. 10 illustrates the case where the PICH among the physical channels stored in the channel information storage unit 105 is set as the specific physical channel. As illustrated in FIG. 10, the specific physical channel information storage unit 309 includes items of a correlation pattern, a channel type, a correlation value between the PICH and another physical channel, and a total correlation value. The correlation pattern corresponds to the correlation patterns stored in the correlation pattern storage unit 106. The channel type corresponds to the channel types of other physical channels other than the PICH among the channel types stored in the channel information storage unit 105. The correlation value between the PICH and another physical channel indicates the correlation values calculated by using the respective correlation patterns. The total correlation value is the sums of the correlation values for each of the correlation patterns.

Next, the processing procedures of the correlation pattern selecting processing that is performed by the equalization processing apparatus 300 in the third embodiment are described. FIG. 11 is a flowchart illustrating the processing procedures of the correlation pattern selecting processing that is performed by the equalization processing apparatus 300 in the third embodiment. Detail description of the processing procedures that are the same as the processing procedures as illustrated in FIG. 6 is omitted. That is to say, the pieces of processing at Step S11 to Step S17 as illustrated in FIG. 6 correspond to pieces of processing at Step S31 to Step S37 as illustrated in FIG. 11, respectively.

The following describes the difference in the processing procedures between the third embodiment and the first embodiment. As illustrated in FIG. 11, the correlation pattern selecting unit 307 selects the correlation pattern of which the index value C is the smallest among the correlation patterns stored in the correlation pattern storage unit 106 (Step S37). The correlation pattern selecting unit 307 calculates the sums of the correlation values between the specific physical channel and other physical channels as the certain values indicating the degree of the orthogonality between the specific physical channel and other physical channels for each of the correlation patterns stored in the correlation pattern storage unit 106 (Step S38). For example, the correlation pattern selecting unit 307 sets the PICH as the specific physical channel, and calculates the sums of the correlation values between the PICH and the other physical channels for each of the correlation patterns. Then, the correlation pattern selecting unit 307 stores the calculated sums of the correlation values in the specific physical channel information storage unit 309 for the respective corresponding correlation patterns.

Thereafter, the correlation pattern selecting unit 307 determines whether the sum of the correlation values that corresponds to the selected correlation pattern is "0" with reference to the specific physical channel information storage unit 309. In other words, when the correlation pattern selecting unit 307 sets the selected correlation pattern to the correlation matrix generating unit 108, it determines whether the orthogonality between the specific physical channel and the other physical channels is kept (Step S39). If the orthogonality between the specific physical channel and the other physical channels is kept (Yes at Step S39), the correlation pattern selecting unit 307 sets the selected correlation pattern to the correlation matrix generating unit 108 (Step S40).

On the other hand, if the orthogonality between the specific physical channel and the other physical channels is not kept (No at Step S39), the correlation pattern selecting unit 307 determines whether all the correlation patterns stored in the correlation pattern storage unit 106 have been selected (Step S41). If the correlation pattern selecting unit 307 have selected all the correlation patterns stored in the correlation pattern storage unit 106 (Yes at Step S41), it sets the correlation pattern of which the index value C is the smallest that has been selected at Step S37 to the correlation matrix generating unit 108 (Step S42).

On the other hand, if the correlation pattern selecting unit 307 have not selected all the correlation patterns (No at Step S41), it selects the correlation pattern of which the index value C is the smallest from the correlation patterns other than the correlation pattern that has been selected previously (Step S43). Then, the process is returned to the processing at Step S39.

As described above, the equalization processing apparatus 300 in the third embodiment calculates the certain values indicating the degree of the orthogonality between the specific physical channel and other physical channels for each of the correlation patterns, and selects the correlation pattern having the certain value of 0 in priority to the correlation pattern of which the index value C is the smallest. With this, the equalization processing apparatus 300 can keep the orthogonality between the specific physical channel and other physical channels. This can reduce inter-code interference that is given to the other physical channels by the specific physical channel.

One aspect of the equalization processing apparatus disclosed by the present application achieves an effect of reducing deterioration of the equalization characteristics with a reduced amount of operation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An equalization processing apparatus comprising:
a memory; and
a processor coupled to the memory, wherein
the memory stores therein a plurality of correlation patterns indicating combinations of numbers of correlation chips as arbitrary chips to be used for calculation of a correlation value between a plurality of paths of a received signal coming from the paths among all the chips of the received signal and identification numbers of the correlation chips and stores therein spreading codes assigned to respective channels that change when the respective channels are increased or decreased by a handover of a wireless communication terminal including the equalization processing apparatus, and
the processor is configured to execute a process including:
calculating index values indicating a degree of orthogonality between the spreading codes assigned to the respective channels included in the received signal for each of the correlation patterns stored in the memory;
selecting a correlation pattern of which the index value is smallest among the correlation patterns stored in the memory; and
generating a correlation matrix that is applied to equalization processing on the received signal by calculating the correlation value based on the selected correlation pattern, wherein
the calculating includes monitoring the memory so as to detect, when the respective channels are increased or decreased by the handover of the wireless communication terminal, whether a change in the spreading codes assigned to the respective channels occurs or not, and when the change in the spreading codes is detected, calculating, as the index values, sums of multiplied results obtained by multiplying correlation values between the spreading codes assigned to the respective channels by a ratio of transmission power of the respective channels relative to sums of the transmission powers for the respective correlation patterns, and
the selecting includes selecting the correlation pattern of which the calculated index value is the smallest among the correlation patterns stored in the memory.

2. The equalization processing apparatus according to claim 1, the process further includes:
limiting the channels as targets of calculation of the index values at the calculating.

3. The equalization processing apparatus according to claim 2, wherein the calculating includes calculating certain values indicating a degree of orthogonality between a specific channel and channels other than the specific channel for each of the correlation patterns, and
the selecting includes selecting the correlation pattern having the certain value of 0 in priority to the correlation pattern of which the index value is the smallest among the correlation patterns stored in the memory.

4. A wireless communication terminal comprising:
a memory; and
a processor coupled to the memory, wherein
the memory stores therein a plurality of correlation patterns indicating combinations of numbers of correlation chips as arbitrary chips to be used for calculation of a correlation value between a plurality of paths of a received signal coming from the paths among all the chips of the received signal and identification numbers of the correlation chips and stores therein spreading codes assigned to respective channels that change when the respective channels are increased or decreased by a handover of the wireless communication terminal, and the processor is configured to execute a process including:

receiving the signal transmitted from a base station;

calculating index values indicating a degree of orthogonality between the spreading codes assigned to the respective channels included in the received signal for each of the correlation patterns stored in the memory;

selecting a correlation pattern of which the index value is smallest among the correlation patterns stored in the memory; and generating a correlation matrix that is applied to equalization processing on the received signal by calculating the correlation value based on the selected correlation pattern, wherein the calculating includes monitoring the memory so as to detect, when the respective channels are increased or decreased by the handover of the wireless communication terminal, whether a change in the spreading codes assigned to the respective channels occurs or not, and when the change in the spreading codes is detected, calculating, as the index values, sums of multiplied results obtained by multiplying correlation values between the spreading codes assigned to the respective channels by a ratio of transmission power of the respective channels relative to sums of the transmission powers for the respective correlation patterns, and the selecting includes selecting the correlation pattern of which the calculated index value is the smallest among the correlation patterns stored in the memory.

5. An equalization processing method that is executed by an equalization processing apparatus that stores in a memory a plurality of correlation patterns indicating combinations of numbers of correlation chips as arbitrary chips to be used for calculation of a correlation value between a plurality of paths of a received signal coming from the paths among all the chips of the received signal and identification numbers of the correlation chips and stores in the memory spreading codes assigned to respective channels that change when the respective channels are increased or decreased by a handover of a wireless communication terminal including the equalization processing apparatus, the equalization processing method comprising:

calculating index values indicating a degree of orthogonality between the spreading codes assigned to the respective channels included in the received signal for each of the correlation patterns stored in the memory;

selecting a correlation pattern of which the index value is smallest among the correlation patterns stored in the memory; and generating a correlation matrix that is applied to equalization processing on the received signal by calculating the correlation value based on the selected correlation pattern, wherein the calculating includes monitoring the memory so as to detect, when the respective channels are increased or decreased by the handover of the wireless communication terminal, whether a change in the spreading codes assigned to the respective channels occurs or not, and when the change in the spreading codes is detected, calculating, as the index values, sums of multiplied results obtained by multiplying correlation values between the spreading codes assigned to the respective channels by a ratio of transmission power of the respective channels relative to sums of the transmission powers for the respective correlation patterns, and the selecting includes selecting the correlation pattern of which the calculated index value is the smallest among the correlation patterns stored in the memory.

* * * * *